United States Patent [19]

Buczynski et al.

[11] 4,324,444
[45] Apr. 13, 1982

[54] SNAP-IN BEARING RETAINER AND BEARING

[75] Inventors: Neal J. Buczynski; Edward W. Kern, Jr., both of Jamestown, N.Y.

[73] Assignee: TRW Inc., Cleveland, Ohio

[21] Appl. No.: 176,885

[22] Filed: Aug. 11, 1980

[51] Int. Cl.³ ............................................. F16C 33/38
[52] U.S. Cl. .................................................... 308/201
[58] Field of Search ................................. 308/199, 201

[56] References Cited

U.S. PATENT DOCUMENTS

| 3,146,039 | 8/1964 | Dunn | 308/201 |
| 3,450,449 | 6/1969 | Sibley et al. | 308/201 |
| 3,506,316 | 4/1970 | McKee | 308/193 |
| 3,649,093 | 3/1972 | Muratore et al. | 308/193 |
| 3,749,461 | 7/1973 | Liss et al. | 308/201 |
| 4,040,687 | 8/1977 | Rogers | 308/201 |
| 4,126,362 | 11/1978 | Hamblin et al. | 308/201 |
| 4,136,915 | 1/1979 | Derner | 308/201 |
| 4,226,484 | 10/1980 | Glassow et al. | 308/201 |
| 4,243,276 | 1/1981 | Persson et al. | 308/201 |
| 4,278,307 | 7/1981 | Olschewski et al. | 308/201 |

FOREIGN PATENT DOCUMENTS

| 2308013 | 11/1976 | France | 308/201 |
| 2049070 | 12/1980 | United Kingdom | 308/201 |

Primary Examiner—Richard R. Stearns
Attorney, Agent, or Firm—Daniel G. Blackhurst

[57] ABSTRACT

A new and improved high speed snap-in type bearing retainer or cage and a bearing construction wherein the retainer includes means to effect retainer piloting and thereby enhance retainer control and stability during high speed applications while accommodating ease of retainer installation into an associated bearing construction. The retainer is of a one-piece plastic or nylon construction having a cylindrical retainer body and a plurality of ball receiving pockets positioned on one side of the body so as to extend axially outward thereof. The pockets include entrance areas at the outermost ends thereof which are defined by opposed, yieldable fingers dimensioned to capture a ball member therein. Web areas are interposed between adjacent pockets circumferentially of the retainer body and extend axially outward a distance greater than the pocket entrance areas. A first pilot rim is provided circumferentially of the retainer body to pilot against at least one of an associated inner and outer bearing race. A second pilot rim defined by pilot rim segments included on the web areas circumferentially of the retainer body pilots against at least the other of an associated inner and outer bearing race. If desired, the first and second pilot rims may be configured to each include portions that pilot against both the inner and outer races.

6 Claims, 5 Drawing Figures

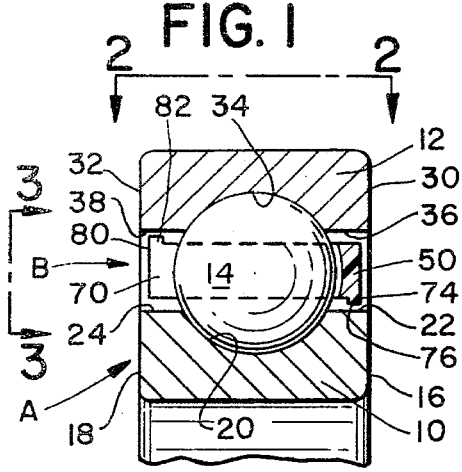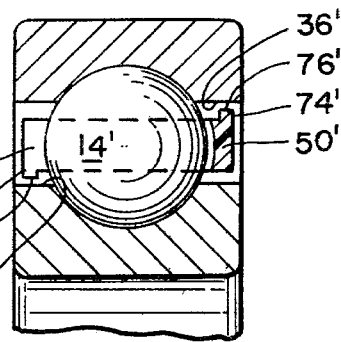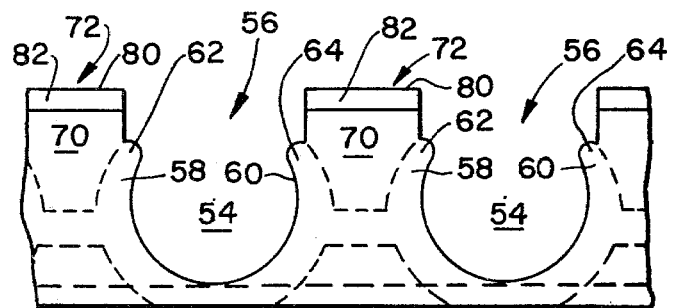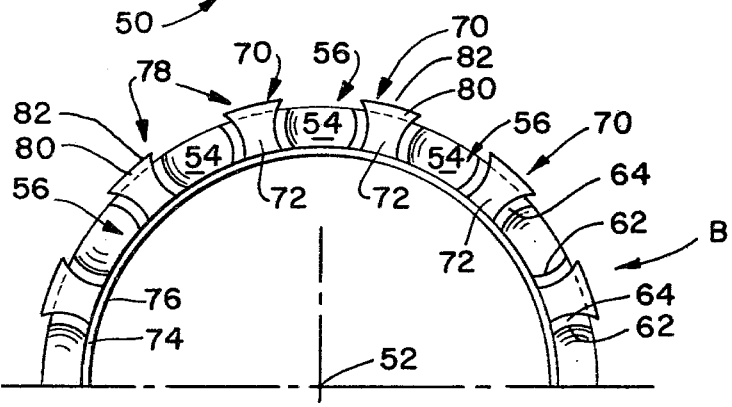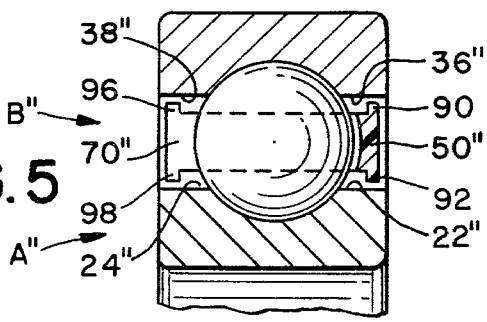

SNAP-IN BEARING RETAINER AND BEARING

BACKGROUND OF THE INVENTION

This invention pertains to the art of bearing constructions and more particularly to retainers or cages employed to maintain appropriate spacing between individual bearing members.

The invention is particularly applicable to a snap-in ball retainer or cage for a ball bearing assembly wherein the retainer comprises a one-piece molded plastic or nylon construction which snaps onto or captures the ball members intermediate inner and outer bearing races and which also includes retainer pilot means as a part thereof. While the invention will be described with particular reference to this type of construction, it will be appreciated by those skilled in the art that the invention has broader applications and may be used in other environments.

Generally, bearing cages for ball type bearing assemblies are provided to maintain proper spacing between the ball members interposed between inner and outer bearing races. In high speed bearing applications, the retainer or cage loses its stability which has an overall detrimental effect on bearing efficiency.

So-called snap-in type bearing retainers are themselves known in the art as shown, for example, in the commonly assigned U.S. Pat. No. 4,040,687 to Rogers. There, a one-piece retainer molded of reinforced plastic material is provided which includes spaced apart ball receiving pockets at spaced intervals circumferentially of a retainer body and opening axially outward thereof. At least some of the ball receiving pockets are configured so as to capture an associated ball member therein. This type of retainer or cage advantageously allows retainer installation into the bearing assembly axially from one side thereof to thereby facilitate ease of assembly for the overall bearing. However, the construction and arrangement disclosed by U.S. Pat. No. 4,040,687 does not provide any means to pilot the retainer relative to the bearing races so as to eliminate retainer instability during high speed operations.

U.S. Pat. Nos. 3,649,093 to Muratore, et al. and 3,506,316 to McKee disclose prior ball retainers or cages which include pilot means associated therewith. However, and while generally addressing the aforementioned control and instability problems, U.S. Pat. No. 3,649,093 discloses a two-piece separator which must be assembled from opposite sides of the associated bearing assembly as by rivoting or the like in order to capture and position the individual ball members relative to each other. U.S. Pat. No. 3,506,316 provides axially open ball member receiving slots in a side mounted bearing cage with cage piloting being effected directly in the circumferential raceway of one of the inner and outer races.

It has, therefore, been considered desirable to develop a bearing retainer or cage to overcome the foregoing problems as well as others and provide a one-piece snap-in type retainer construction which would facilitate ease of installation and capture of ball members in individual retainer pockets. At the same time, the retainer would include means for piloting it off of the inner and outer bearing races to provide stability during high speed bearing applications. The subject invention meets these needs and provides such a retainer in a manner which will be described hereinafter.

BRIEF DESCRIPTION OF THE INVENTION

In accordance with the present invention, there is provided a new and improved snap-in type of bearing retainer particularly adapted for use in a ball type bearing assembly. The retainer includes first means adapted to pilot off of the outer surface of an associated inner bearing race and second means adapted to pilot off of the inner surface of an associated outer bearing race. A bearing construction which employs the new and improved retainer is also provided.

More particularly in accordance with the invention, the bearing retainer includes a generally cylindrical retainer body having a longitudinal axis with a plurality of ball receiving pockets extending axially outward from one side of the body circumferentially therearound at substantially equidistantly spaced intervals. The pockets each include a pocket entrance area opening axially outward generally parallel to the longitudinal axis and are defined between opposed outwardly yieldable fingers having outermost finger ends generally facing each other in a spaced apart relationship which is less than the maximum width of the associated pocket. A web area is interposed between at least selected ones of the pockets circumferentially of the retainer body a greater distance than the ball receiving pocket entrance areas. First pilot means is associated with the retainer body and second pilot means is associated with at least selected ones of the web areas. The first pilot means is adapted to pilot against at least one of the inside surface of an associated outer bearing race and the outside surface of an associated inner bearing race and the second pilot means is adapted to pilot against at least the other of the outside and inside surfaces to provide retainer stability during high speed relative rotation between the inner and outer bearing races.

According to another aspect of the invention, the first pilot means is defined by a first pilot rim disposed circumferentially of the retainer body and having a first portion extending in at least one radial direction therefrom. The second pilot means is defined by a second pilot rim comprised of pilot ring segments associated with at least selected ones of the web areas circumferentially of the retainer body. These ring segments have second portions extending in at least a radial direction opposite to at least one direction.

In accordance with a more limited aspect of the invention, the first pilot ring includes a third portion extending in the opposite radial direction from the first portion and the pilot ring segments include fourth portions extending in the opposite radial direction from the second portion. The first and fourth portions are dimensioned to facilitate piloting of the retainer against one of an associated inner and outer bearing race. The second and third portions are dimensioned to facilitate piloting against the other of the bearing races as required during bearing operation.

The principal object of the present invention is the provision of a new and improved bearing retainer or cage and bearing construction which accommodate ease of retainer installation and facilitate retainer piloting as necessary during bearing operation.

Another object of the invention is the provision of such a retainer construction which is easy to manufacture and install on an associated bearing assembly.

A further object of the invention is the provision of a new and improved bearing retainer or cage which is readily adapted to use with a variety of bearing types and designs.

Still other objects and advantages to the invention will become apparent to those skilled in the art upon a reading and understanding the following specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein:

FIG. 1 is a somewhat schematic transverse cross section taken through a bearing assembly which incorporates the concepts of the subject invention thereinto;

FIG. 2 is a partial plan view of the bearing retainer itself as viewed in the direction of arrows 2—2 of FIG. 1 with outer race and the ball members removed for ease of illustration;

FIG. 3 is a partial side elevation of the new bearing retainer by itself taken generally in the direction of arrows 3—3 of FIG. 1;

FIG. 4 is a view similar to FIG. 1 showing one alternative embodiment which incorporates the concepts of the subject invention; and, FIG. 5 is a view similar to FIG. 1 showing a second alternative embodiment.

DETAILED DESCRIPTION OF THE PREFERRED AND ALTERNATIVE EMBODIMENTS

Referring now to the drawings wherein the showings are for purposes of illustrating the preferred and alternative embodiments of the invention only and not for purposes of limiting same, FIG. 1 shows a partial transverse cross section through a bearing construction A which includes a bearing retainer or cage B.

More particularly, the bearing construction generally includes cylindrical inner and outer bearing races 10,12 having a plurality of ball members 14 interposed radially therebetween and extending circumferentially thereof. Inner race 10 includes opposed annular end faces 16,18. The peripheral inner surface is defined by a generally centrally disposed circumferential raceway 20 having an arcuate or curved cross section and a pair of lands 22,24 extending from the raceway to end faces 16,18, respectively. Outer race 12 similarly includes opposed annular end faces 30,32, an arcuate raceway 34 and lands 36,38. Raceways 20,34 are dimensioned to receive and accommodate balls 14 therein in a manner known in the art.

Referring to FIGS. 1, 2 and 3, bearing retainer or cage B comprises a one-piece construction molded from some suitable reinforced plastic material, nylon or the like. The retainer includes a cylindrical body or backbone 50 having a longitudinal axis 52 (FIG. 3). This retainer body or backbone is dimensioned so as to be received in the annular space defined between the outer peripheral surface of inner race 10 and the inner peripheral surface of outer race 12. A plurality of ball retaining pockets 54 extend axially outward from one side of body 50 and are spaced apart from each other at generally equidistant intervals circumferentially thereof. The walls of ball retaining pockets 54 are advantageously spherically shaped and dimensioned so as to accommodate free rolling movement of an associated ball member when received therein.

As best shown in FIGS. 2 and 3, each retaining pocket includes an entrance area 56 defined by opposed fingers 58,60 which terminate in outermost finger ends or tips 62, 64, respectively. As will be seen from FIG. 3, these ends or tips are generally arcuately shaped compatible with the spherical conformation of the pocket side walls. The width between ends or tips 62,64 of each retaining pocket 54 is somewhat less than the maximum width of the retaining pocket, i.e., less than the diameter of the ball member 14 which is to be received therein. Because of the plastic or nylon construction, the ends or tips are yieldably movable apart from each other so as to permit passage of an associated ball member therepassed into the retaining pocket as the retainer or cage is installed into the bearing assembly. As the balls are thus received in pockets 54, finger ends or tips 62,64 move back to their initial position so as to capture and maintain the balls therein.

Continuing with reference to FIGS. 2 and 3, a web area 70 is interposed between each ball retaining pocket and the next adjacent pocket circumferentially of retainer body or backbone 50. These web areas extend axially of the body or backbone in the same direction as receiving pockets 54 and have outermost ends 72 spaced axially of the pocket entrance areas 56. In addition, the widths of web areas 70 are such that they are spaced from finger ends or tips 62,64 so as to permit free ball passage therepassed and prevent interference with the above described yieldable movement of the finger ends. The specific conformation of web areas 70 may be modified as deemed necessary and/or appropriate from the general arrangement shown in order to accommodate a particular bearing cage design and/or application.

Referring to all of FIGS. 1, 2 and 3, a first pilot means 74 extends radially inward from body or backbone 50 and is defined by a rim-like area or tab having a circumferential inner pilot surface 76. In like fashion, a second pilot means 78 is associated with web areas 70 so as to extend radially outward circumferentially of body 50. This second pilot means is defined by a plurality of pilot rim segments or tabs 80 with one such segment being associated with each of web areas 70. As best seen in FIGS. 1 and 3, these pilot rim segments each include an outer pilot surface 82. The axial spacing between first and second pilot means 74,78 is such that they are cooperable with the bearing race lands in a manner to be described.

FIG. 1 shows the above described bearing retainer or cage B as it has been inserted or installed onto bearing construction A in a right to left direction as viewed therein. Balls 14 are, of course, each captured in an associated one of ball retaining pockets 54 in the manner previously described. As shown, inner pilot surface 76 of first pilot means 74 extends toward but is spaced from land 22 of inner race 10. In like fashion, outer pilot surfaces 82 of pilot rim segments 80 extend toward but are spaced from land 38 of outer bearing race 12. The precise spacing between surfaces 76,22, and surfaces 82,38 does not itself form a part of the present invention and is designed to be compatible or commensurate with clearances normally acceptable in high speed bearing applications.

During actual use of the bearing hereinabove described with reference to FIGS. 1, 2 and 3, first and second pilot means 74,78 may advantageously pilot against inner and/or outer bearing races 10,12, respectively, in response to radial shifting of the retainer. This feature is particularly significant and advantageous in high speed bearing applications for reducing retainer or cage instability, which can adversely affect bearing operation and efficiency.

FIG. 4 shows a slight modification to the above described embodiment. For ease of illustration and appreciation of this modification, like components are identified by like numerals with a primed (') suffix. In FIG. 4, the radial positioning or direction of first pilot means 74' relative to body or backbone 50' and the radial direction of pilot rim segments 80' relative to web areas 70' have been reversed. That is, pilot surface 76 of first pilot means 74 is adapted to pilot off of land 36' of the outer bearing race with pilot surfaces 82' of pilot segments 80' adapted to pilot off of land 24' of the inner bearing race. Installation and operation of this alternative is substantially the same as that previously described.

FIG. 5 shows a further modification to the piloting structure of the subject invention. Here, like components are identified by like numerals with a double primed ('') suffix and the new components are identified by new numerals. More particularly, this alternative employs a first pilot means associated with retainer body or backbone 50'' which is comprised of opposed radially extending first and second pilot portions 90,92. In like fashion, webs 70'' each include third and fourth pilot portions 96,98 extending in radially opposite directions. Portions 90,96 and portions 92,98 are dimensioned so that the outermost ends thereof are radially coextensive with each other. As a result, bearing retainer or cage B'' may be piloted off of lands 36'',38'' by means of pilot portions 90,96, respectively, or may be piloted off of lands 22'',24'' by pilot portions 92,98. The clearance between the pilot portions and lands are, again, conventional and the overall piloting results are substantially as previously described.

The invention has been described with reference to preferred and alternative embodiments. Obviously, modifications and alternations will occur to others upon a reading and understanding of this specification. It is intended to include all such modifications and alternations insofar as they come within the scope of the appended claims or the equivalents thereof.

Having thus described the invention, it is now claimed:

1. A snap-in type bearing retainer adapted to be piloted off at least one of the outer surface of an associated inner bearing race and the inner surface of an associated outer bearing race, said retainer comprising:
   a generally cylindrical retainer body having a longitudinal axis, a plurality of ball receiving pockets extending axially outward from one side of said body circumferentially therearound at substantially equidistantly spaced intervals, said pockets each including a pocket entrance area opening axially outward generally parallel to said axis and being defined between opposed outwardly yieldable fingers having outermost finger ends generally facing each other in a spaced apart relationship which is less than the maximum width of the associated pocket;
   a web area interposed between at least selected ones of said pockets circumferentially of said retainer body, said web areas extending axially outward of said retainer body a greater distance than the entrance areas of said ball receiving pockets;
   first means associated with said retainer body for piloting said retainer; and,
   second means associated with at least selected ones of said web areas for piloting said retainer, said first pilot means adapted to pilot against at least one of the inside surface of an outer race and the outside surface of an inner race and said second pilot means adapted to pilot against at least the other of the outside and inside surfaces when said retainer is axially installed on a bearing assembly in order to provide enhanced retainer control and stability during high speed operation of the bearing assembly; and
   wherein said first pilot means comprises a rim-like member extending in at least one radial direction of said retainer body longitudinal axis and said second pilot means comprises a plurality of rim-like segments associated with at least selected ones of said web areas extending radially of said retainer body longitudinal axis at least in the opposite direction from said one radial direction.

2. The retainer as defined in claim 1 wherein said rim-like member includes first and second portions extending in opposite radial directions and said rim-like segments include third and fourth portions extending in opposite radial directions, said first and third portions and said second and fourth portions comprising cooperating pairs which extend radially coextensive with each other.

3. In a snap-in type of bearing retainer adapted for use with a bearing assembly having a cylindrical outer race, a cylindrical inner race and a plurality of spaced apart ball members disposed circumferentially of and radially between said inner and outer races and wherein said retainer includes a generally cylindrical retainer body having a plurality of ball receiving pockets extending axially outward from one side thereof with at least some of said pockets having outermost entrance areas defind by finger-like members which are yieldable to accommodate capture of an associated ball member therein, the improvement comprising:
   a web area interposed between each of said ball receiving pockets circumferentially of said retainer body, said web areas extending axially outward of said retainer body a greater distance than said pocket entrance areas; a first pilot rim disposed circumferentially of said retainer body and extending in at least one radial direction therefrom; and, a second pilot rim defined by arcuate pilot rim segments associated with said web areas circumferentially of said retainer body, said segments radially extending from said web areas at least the direction opposite to said at least one radial direction, said first pilot rim adapted to pilot against a land area adjacent the raceway of at least one of an inner and outer race in an associated bearing assembly and said second pilot rim is adapted to pilot against a land area adjacent the raceway of at least the other of the inner and outer races, whereby said retainer will be controlled and stabilized during high speed operations of an associated bearing assembly.

4. A high-speed roller bearing construction comprising in combination:
   a cylindrical outer bearing race having an inner circumferential surface including an outer raceway;
   a cylindrical inner bearing race having an outer circumferential surface including an inner raceway;
   a plurality of ball members received in and interposed between said inner and outer raceways circumferentially thereof; and, a generally cylindrical retainer body having a longitudinal axis, a plurality of ball receiving pockets extending axially outward from one side of said body circumferentially therearound at substantially equidistantly spaced intervals to each other, said pockets each including a pocket entrance area opening axially outward generally parallel to said axis and being defined between opposed outwardly yieldable fingers having outermost finger ends generally facing each other in a spaced apart relationship which is less than the diameter of said ball members; a web area interposed between each of said pockets and the next adjacent pocket circumferentially of said retainer body, said web areas extending axially outward of said retainer body a greater distance than said pocket entrance areas; a first pilot rim disposed circumferentially of said retainer body and including a first portion extending in at least one radial direction therefrom; and, a second pilot rim defined by arcuate pilot rim segments associated with said web areas circumferentially of said retainer body, said segments having second portions extending in at least a radial direction opposite to said at least one direction, said retainer body being separately installable into said bearing construction axially of and radially intermediate said bearing races with said ball members being rollingly captured in said receiving pockets, the radial extents of said pilot rim first and second portions being such that one of said portions may cooperate with at least one of said inner and outer races and the other of said portions may cooperate with at least the other of said inner and outer races to pilot said retainer at least during high speed bearing operations to maintain desired retainer control and stability.

5. The bearing construction as defined in claim 4 wherein said first pilot rim includes a third portion extending in the opposite radial direction from said first portion and said pilot rim segments include fourth portions extending in the opposite radial direction from said second portions, said first and fourth portions being dimensioned to facilitate piloting of said retainer against said one race and said third and second portions being dimensioned to facilitate piloting against said other race.

6. A snap-in type bearing retainer adapted to be piloted off at least one of the outer surface of an associated inner bearing race and the inner surface of an associated outer bearing race, said retainer comprising:

a generally cylindrical retainer body having a longitudinal axis, a plurality of ball receiving pockets extending axially outward from one side of said body circumferentially therearound at substantially equidistantly spaced intervals, said pockets each including a pocket entrance area opening axially outward generally parallel to said axis and being defined between opposed outwardly yieldable fingers having outermost finger ends generally facing each other in a spaced apart relationship which is less than the maximum width of the associated pocket;

a web area interposed between at least selected ones of said pockets circumferentially of said retainer body, said web areas extending axially outward of said retainer body a greater distance than the entrance areas of said ball receiving pockets;

first means associated with said retainer body for piloting said retainer; and, second means associated with at least selected ones of said web areas for piloting said retainer, said first pilot means adpated to pilot against at least one of the inside surface of an outer race and the outside surface of an inner race and said second pilot means adapted to pilot against at least the other of the outside and inside surfaces when said retainer is axially installed on a bearing assembly in order to provide enhanced retainer control and stability during high speed operation of the bearing assembly; and, wherein a web area is interposed between each of said ball receiving pockets, said second pilot means comprising an arcuate rim segment associated with each of said web areas and extending radially of said body.

* * * * *